United States Patent [19]

Balters et al.

[11] 3,964,931

[45] June 22, 1976

[54] CATHODE FOR ALKALINE PRIMARY BATTERIES

[75] Inventors: Helmut Balters, Abtsgmund; Gerhard Schneider, Ellwangen, both of Germany

[73] Assignee: VARTA GmbH, Ellwangen, Germany

[22] Filed: Oct. 31, 1973

[21] Appl. No.: 411,279

Related U.S. Application Data

[62] Division of Ser. No. 203,058, Nov. 29, 1971, abandoned.

[30] Foreign Application Priority Data

Nov. 30, 1970  Germany............................ 2058768

[52] U.S. Cl............................ 136/107; 136/120 R
[51] Int. Cl.²........................................ H01M 21/00
[58] Field of Search............ 136/120 FC, 120 R, 20, 136/107, 134–135, 111, 108, 109, 110, 137, 7

[56] References Cited

UNITED STATES PATENTS

| | | | |
|---|---|---|---|
| 975,980 | 11/1910 | Morrison | 136/20 |
| 2,829,189 | 4/1958 | Coleman et al. | 136/107 |
| 2,942,052 | 6/1960 | Bourke et al. | 136/20 X |
| 3,056,850 | 10/1962 | Rauske et al. | 136/135 R X |
| 3,347,709 | 10/1967 | Taylor et al. | 136/108 |
| 3,615,858 | 10/1971 | Soto-Krebs | 136/107 |

*Primary Examiner*—Anthony Skapars
*Attorney, Agent, or Firm*—Herbert L. Lerner

[57] ABSTRACT

Cathode for alkaline primary batteries, which contain mercury oxide depolarizing cathode and an addition of $Ag_2O$. The $Ag_2O$ addition is from 2 to 10% by weight of the cathode mass.

6 Claims, No Drawings

CATHODE FOR ALKALINE PRIMARY BATTERIES

This application is a divisional application Ser. No. 203,058 filed Nov. 29, 1971, now abandoned.

The present invention relates to a cathode for alkaline primary batteries, which contains mercuric oxide as the depolarizer.

The HgO cathode in alkaline aqueous solutions has a potential fixed within narrow limits against the usual anode metals. For instance, the potential against zinc is about 1.35 V, and against cadmium 0.90 V, etc. These values are measured even after a certain rest period has passed following a partial discharge of the batteries (cells) so that in general, measurement of the voltage will not disclose whether such a cell is not at all, partially or almost completely discharged.

Though the voltage of an HgO-Zn cell up to a certain degree also depends upon the ZnO concentration of the electrolyte, which is known to undergo a strong, temporary rise during discharge as a result of oversaturation, the cells which still contain functionable electrodes will, in resting condition, hardly exceed or fall below values of 1.34 or 1.36 V.

Many conventional HgO-Zn batteries contain manganese addition for the cathode. Since the potential of manganese is above that of the HgO, the voltage of these cells is also higher than that of pure HgO-Zn cells, i.e. the rated voltage being, for example, 1. V, while the values taken at cells that are freshly purchased were between 1.43 and 1.47 and the voltage of pure alkaline manganese-zinc cells is about 1.55V. These strongly varying values are apparently connected with the manganese characteristic of passing a homogeneity range during reduction, whose width varies according to modification. An open voltage, which is much higher than 1.36 V is always a sure sign that an HgO-Zn cell with manganese addition is still unconsumed, meaning that the HgO which constitutes the predominant share of the cathode capacity, has not yet been attacked. During discharging, the cathode component having the highest potential will be reduced first. Hence, manganese is a useful indicator for the partial discharge of cells with an HgO cathode, at least if these cells are not connected, as a plurality, in series within a battery.

In such event, it is required that the lowest value that can be assumed by the open voltage of a battery comprising cells with an intact indicator, must be higher than the open voltage of a battery where all cells are at the upper voltage limit, except for one cell wherein the indicator is consumed, i.e. wherein an uncontrollable part of the depolarizer can be consumed:

$$n \times U_{min} > (n-1) \times U_{max} + 1.36 \text{ V}$$

Here, $n$ indicates the number of series connected cells; $U_{min}$ and $U_{max}$, respectively, indicates the lowest or the highest value of the open voltage of a cell, with an intact indicator. The voltage of a cell with consumed indicator is assumed at 1.36 V. It then follows that:

$$n < \frac{U_{max} - 1.36 \text{ V}}{U_{max} - U_{min}}$$

Hence, an indicator is suitable for a greater number of series connected cells, the larger the maximum voltage difference between cells with and without indicator and the smaller the stray width of the voltage of cells with indicator.

The afore-indicated values for HgO cells with manganese addition result in:

$$n < \frac{1.47 - 1.36}{1.47 - 1.43} = \frac{0.11}{0.03}$$

i.e. the manganese indicator would be suitable under these requirements for batteries having no more than three series-connected cells.

It is an object of the present invention to provide a positive electrode for alkaline primary cells that contains an indicator suitable for multicell batteries.

To this end, and in accordance with the invention, the cathode contains an addition of silver (I)-oxide.

The potential of a substance to be installed as an indicator into multicell batteries should not only exceed far above the potential of the depolarizer but should also be constant within the narrowest possible limits. The potential of $Ag_2O$ is around 0.247 V above that of the HgO and, as can be seen from the below indicated example, cells of the same construction have voltage strays of no more than 0.015 V so that we have approximately:

$$n < \frac{0.24}{0.015}$$

meaning that according to these findings $Ag_2O$ is suitable as indicator for batteries with 15 cells.

A share of $Ag_2O$ in the cathode mass, between 2% and 10%, preferably between 4 and 6% was found to be particularly preferable. The $Ag_2O$ can simply be admixed to the cathode mass. However, the depolarization mass and a suitable $Ag_2O$ mass may be processed in separate molds and be subsequently joined in the cell. Alternatively, both masses may be processed while partially separated, in the same mold. The two last described methods are used for placing the $Ag_2O$ mass on the side of the cathode that is turned away from the anode, which makes the diffusion of silver oxide (soluble in small concentrations in the electrolyte) more difficult in the direction of the anode. It is known that the solubility of the $Ag_2O$ in alkaline hydroxide requires the use of narrow porous separators in cells that contain $Ag_2O$ as depolarizers. A suitable placement of the $Ag_2O$ masses in the cell, as previously mentioned, has the same beneficial effect as the use of a narrow porous separator.

The following shows some examples of a cathode according to the invention:

1. A cathode mass of:

| | | | |
|---|---|---|---|
| HgO | — | 87 | parts by weight |
| $Ag_2O$ | — | 5 | " |
| graphite | — | 8 | " |
| binder | — | 0.75 | " | pressed into tablets, with amalgamated zinc powder as anode mass and potassium hydroxide with dissolved zincate as electrolyte, cells were produced in a known manner, whose construction, basically resembles that of conventional button cells. Four days after production, the open voltage of these cells was between 1.577 V and 1.587. After a one year storage, one cell went completely dead; one cell showed the onset of self-discharge at 1.653 V. while the remaining, approximately 40, cells had voltages between 1.578 and 1.582 V and almost unchanged capacity.

2. Small tablets consisting of a mass of 100 parts by weight Ag$_2$O, 1 part by weight graphite and 0.5 parts by weight binder, which were first superficially reduced, were pressed into a cathode of a mass comprising 92 parts by weight HgO, 8 parts by weight graphite and 0.75 parts by weight of an organic binder. The share of Ag$_2$O in the cathode was to about 5%. Some of these cathodes were so built into the cells that the Ag$_2$O tablet faced the anode; some were reversed so that the Ag$_2$O tablet lay upon the cup bottom. In the first instance, following a one year storage at normal temperatures, a little silver had diffused through the separator into the anode chamber, while in the second embodiment, however, no trace of this was found. In both embodiments the open voltage was between 1.583 and 1.585 V, and after 1 year between 1.579 and 1.581 V. Cells that were opened following this period showed traces of incipient oxidation of the zinc, the Ag$_2$O tablets were partly reduced; the HgO was still completely unused.

3. Ag$_2$O and HgO masses were separately placed into the stamper and pressed in common. In one variation of this method, the Ag$_2$O mass was provided with an addition of a graphite volume, required to obtain an adequate conductivity. This was not done in the other variation. In the latter instance, in order to effect a superficial reduction of the Ag$_2$O content, the entire combined tablet was dipped for a short period, into a reduction bath. During these tests, the cathode contained also about 5% Ag$_2$O. In both variations, the initial values of the open voltages were between 1.581 and 1.586 V. after one month, they were between 1.589 V and 1.592 V.

4. Fresh cells whose cathodes were constructed as described in Examples 2 and 3, were discharged daily for 10 seconds through a 15 Ohm resistance, this load corresponding to a test specified for the cell type on hand. Up to now the cells withstood 36 of these discharge periods without a fundamantal change in the open voltage (measured prior to each discharge).

5. Fresh and one year old cells of a construction described in Example 2, were discharged by 2.5 hours through 15 Ohms, whereby approximaltely 8% of the capacity was delivered. As was expected, the cells assumed thereby the voltage of pure HgO cells. 47 days after the discharge, open voltages between 1.356 and 1.358 V were measured. A renewed discharge with 15 Ohm delivered the expected remaining capacity.

The practice of adding Ag$_2$O, according to the invention, to cathodes of alkaline cells which contain HgO as depolarizer, provides a reliable indicator for the partial discharging of cells in batteries with series connection.

We claim:

1. In a cell having a positive electrode, a negative electrode and an electrolyte, said cell being for use with a multi-cell battery, said positive electrode consisting essentially of mercury oxide and means for providing an indication of the state of discharge of said cell consisting of silver (I) oxide, said silver (I) oxide being from 2 to 10% by weight of the positive electrode mass.

2. In a cell as set forth in claim 1, the silver (I) oxide being 4 to 6% by weight of the positive electrode.

3. In a cell as set forth in claim 1, said silver (I) oxide and mercury oxide being each formed as pressed bodies, said silver (I) oxide being disposed to the side of the positive electrode which is turned away from said negative electrode.

4. In a battery having a plurality of series-connected cells, each of said cells having a positive electrode consisting essentially of mercury oxide and means for providing an indication of the state of discharge of said series-connected cells consisting of silver (I) oxide, said silver oxide being from 2 to 10% by weight of the positive electrode mass.

5. In a battery as set forth in claim 4, the ratio of the difference between the potential of the silver (I) oxide and the mercury oxide relative to the difference between the maximum and minimum open voltage of each cell with the silver (I) oxide intact being at least 15.

6. In a battery as set forth in claim 4, the series-connected cells being up to 15 in number.

* * * * *